US007592387B2

(12) United States Patent
Kim et al.

(10) Patent No.: US 7,592,387 B2
(45) Date of Patent: Sep. 22, 2009

(54) CLAY-POLYURETHANE NANOCOMPOSITE AND METHOD FOR PREPARING THE SAME

(75) Inventors: Woo-Nyon Kim, Seoul (KR); Won-Jin Seo, Goyang-si (KR); Jae-Sung Han, Gwacheon-si (KR)

(73) Assignee: Korea University Industry and Academy Cooperation Foundation, Seoul (KR)

( * ) Notice: Subject to any disclaimer, the term of this patent is extended or adjusted under 35 U.S.C. 154(b) by 373 days.

(21) Appl. No.: 10/590,636

(22) PCT Filed: Jan. 7, 2005

(86) PCT No.: PCT/KR2005/000038

§ 371 (c)(1),
(2), (4) Date: Aug. 23, 2006

(87) PCT Pub. No.: WO2005/082993

PCT Pub. Date: Sep. 9, 2005

(65) Prior Publication Data
US 2007/0197709 A1 Aug. 23, 2007

(30) Foreign Application Priority Data
Feb. 28, 2004 (KR) .................. 10-2004-0013782
Jan. 5, 2005 (KR) .................. 10-2005-0000687

(51) Int. Cl.
*C08K 9/06* (2006.01)
(52) U.S. Cl. .................. 524/445; 524/186; 524/447
(58) Field of Classification Search .......... 524/186, 524/445, 447; 521/170
See application file for complete search history.

(56) References Cited

U.S. PATENT DOCUMENTS

| 5,760,121 | A | * | 6/1998 | Beall et al. ............... 524/450 |
| 5,798,533 | A | * | 8/1998 | Fishback et al. ....... 252/182.25 |
| 6,242,500 | B1 | | 6/2001 | Lan et al. |
| 6,410,635 | B1 | * | 6/2002 | Kaylo et al. ............. 524/447 |
| 2003/0050354 | A1 | | 3/2003 | Gilman et al. |

FOREIGN PATENT DOCUMENTS

| KR | 10-2002-95380 | | 12/2002 |
| WO | WO 03/059817 | * | 7/2003 |

OTHER PUBLICATIONS

Y. I. Tien; K. H. Wei "High-Tensile Property Layered Silicates/Polyurethane Nanocomposites by Using Reactive Silicates as Pseudo Chain Extenders" Marcomolecules 2001, 34, 9045-9052.*
Y. I. Tien; K. H. Wei "The Effect of Nano-Sized Silizate Layers from Montmorillonite on GLass Transition, Dynamic MEchanical and THermal Degradation PRoperties of Segmented Polyurethane" J. Appl. Pol. Sci., vol. 86, 1741-1748 (2002).*
International Search Report, dated Apr. 18, 2005, corresponding to PCT/KR2005/000038.
Hu, et al., "Synthesis of polyurethane/clay intercalated nanocomposites", Colloid & Polymer Science, Springer-Verlag, 2001, vol. 279, pp. 819-822 (On Order).
Kim, et al., "Morphology and properties of waterborne polyurethane/clay nanocomposites", European Polymer Journal, Elsevier Science LTD., 2003, vol. 39, pp. 85-91 (On Order).
Feng, et al., "Polymerization compounding: Epoxy-montmorillonite nanocomposite", Polymer Engineering and Science, John Wiley & Sons Inc., Sep. 30, 2002, vol. 42, pp. 1827-1 835 (On Order).
Chen, et al., "Synthesis and characterization of novel segmented polyurethane/clay nanocomposite", Polymer, Elsevier Science LTD., 2000, vol. 41, pp. 1345-1353 (On Order).
Korean Patent Abstracts, Publication No. 1020020095380 A, dated Dec. 26, 2002, in the name of O Yun Kwon.
Hu, et aL., "Synthesis of polyurethane/clay intercalated nanocomposites", Colloid Polymer Science, Springer-Verlag, 2001, vol. 279, pp. 819-822.
Kim, et aL., "Morphology and properties of waterborne polyurethane/clay nanocomposites", European Polymer Journal, Elsevier Science Ltd., 2003, vol. 39, pp. 85-91.
Feng, et aL., "Polymerization compounding: Epoxy-montmorillonite nanocomposite", Polymer Engineering And Science, John Wiley & Sons Inc., Sep. 30, 2002, vol. 42, pp. 1827-1 835.
Chen, et aL., "Synthesis and characterization of novel segmented polyurethane/clay nanocomposite", Polymer, Elsevier Science Ltd., 2000, vol. 41, pp. 1345-1353.

* cited by examiner

*Primary Examiner*—Katarzyna Wyrozebski
(74) *Attorney, Agent, or Firm*—Christie Parker & Hale LLP

(57) ABSTRACT

A clay-polyurethane nanocomposite comprising a clay and a polyurethane covalently bonded to the surface of the clay wherein the polyurethane is formed by reacting a clay-containing diisocyanate compound with a polyol, the clay-containing diisocyanate compound contains a diisocyanate compound covalently bonded to surface silanol groups of the clay and 0.5~5% by weight of the clay based on the diisocyanate compound, and the clay is exfoliated by the polyurethane such that no wide-angle X-ray diffraction (WAXD) peak is detected between 2° and 10° by XRD measurement. The clay-polyurethane nanocomposite structure has clay layers are completely exfoliated. In addition, the clay-polyurethane nanocomposite can be foamed to prepare a foamed clay-polyurethane nanocomposite.

23 Claims, 8 Drawing Sheets

(a)

(b)

(c)

CLAY-POLYURETHANE NANOCOMPOSITE AND METHOD FOR PREPARING THE SAME

CROSS-REFERENCE TO RELATED APPLICATION

This application is a National Phase Patent Application of International Application Number PCT/KR2005/000038, filed on Jan. 7, 2005, which claims priority of Korean Patent Application Number 10-2004-0013782, filed on Feb. 28, 2004, and Korean Patent Application Number 10-2005-0000687, filed on Jan. 5, 2005.

TECHNICAL FIELD

The present invention relates to a clay-polyurethane nanocomposite, and more particularly to a clay-polyurethane nanocomposite with superior mechanical and thermal properties wherein a clay is present in an exfoliated state on a nano-scale.

BACKGROUND ART

Since composite materials have not only improved mechanical and thermal properties but also enhanced dimensional stability and wear resistance as compared with conventional materials, they are widely used in the fields of polymers, metals, ceramics, and all related materials thereof. A number of studies on nanocomposites in which a reinforcement is added to a polymer are being actively undertaken in order to markedly improve the strength, stiffness, efficiency in inhibiting permeability to gases and liquids, flame retardance, wear resistance, high-temperature stability of the polymer, without damage to the impact resistance, ductility and transparency of the polymer.

Such reinforcements that are added to polymers are glass fibers, carbon fibers, clays, and the like. In the mid-1970's, the first nanocomposite prepared from a mixture of a polymer and a clay was developed by researchers from Toyota, who prepared a nylon 6/clay nanocomposite by filling nylon 6 with a clay and manufactured a timing belt box for a vehicle using the nanocomposite.

Clay exists as a laminate of layered silicates as inorganic minerals in nature. Each silicate layer is in the form of a broad plate with a dimension of 1 nm (in thickness)×1 μm (in width) and 1 μm (in length). The high aspect ratio and large surface area of clay silicate layers allow the clay to act as an effective reinforcement upon mixing with a polymer. Exfoliation of the laminated silicate layers enables preparation of a nanocomposite having superior physical properties. However, a disadvantage of clay-polymer composites prepared using clay as a filler is that direct exfoliation and dispersion of a clay in a polymer resin are difficult due to van der Waals attractive forces between the clay layers. Thus, several attempts have been made to intercalate a polymer between clay layers in order to exfoliate the layers from one another and to disperse the clay in the polymer on a molecular level.

To this end, various processes for introducing a polymer into clay layers are currently utilized, for example, a solution-intercalation process wherein a polymer in a liquid state is intercalated between clay layers, a in-situ-polymerization process wherein monomers of a polymer are intercalated between clay layers and are then polymerized, a melt-intercalation process wherein a mixture of a molten polymer and a clay is used in such a manner that the molten polymer is intercalated between the clay layers, etc. The clay used herein is commonly pre-treated with an alkyl ammonium so that the spacing between the clay layers is expanded to facilitate the introduction of the polymer between the layers.

The solution-intercalation process has the problem that the polymer is not sufficiently intercalated between the clay layers. No matter what the polymer is intercalated between the clay layers, the polymer expands the interlayer spacing but fails to exfoliate the clay layers. Accordingly, the intended improvement in physical properties is not achieved.

The melt-intercalation process has a limitation in that the polymer should have a processing temperature not higher than 200° C. The reason for this limitation is that since organic substances, such as alkyl ammonium, contained inside the clay are degraded at a temperature exceeding 200° C. the affinity of the polymer for the clay is deteriorated. In addition, since the layered structure of the clay collapses at high temperature, the interlayer spacing becomes likely to be narrow, making the permeation of the polymer into the layered structure difficult. As in the solution-intercalation process, even if the polymer is intercalated between the clay layers, exfoliation effects of the layers are unsatisfactory.

Korean Patent Laid-open No. 2002-17569 discloses a method for preparing a polyurethane containing clay dispersed in the polymer by mixing and reacting a quaternary ammonium salt-treated clay, an isocyanate compound and a polyol.

However, this process has the drawbacks that the polyurethane cannot be intercalated between the clay layers or cannot exfoliate the clay layers. That is, since the clay and the polyurethane remain only in the form a mixture, no improvement in the physical properties of the polyurethane is expected.

Further, there has been an attempt to intercalate a polyurethane between clay layers to exfoliate the clay layers by dispersing a clay in a long-chained polyol containing hydroxyl groups to intercalate a portion of the polyol between the clay layers, followed by reaction with an isocyanate compound to form a polyurethane. According to this attempt, however, since the surface of the polyol is very weakly bonded to the clay layers by intermolecular attractive forces, such as hydrogen bonding, the polyurethane prepared based on the polyol shows a very weak bonding force with the clay surface due to the intermolecular attractive forces. Accordingly, the interaction between the clay surface and the polyurethane is insufficient to break the bonding force between the clay layers. For this reason, little or no exfoliation of the layers takes place and the preparation of a nanocomposite is impossible, leading to a negligible improvement in physical properties.

On the other hand, a foamed clay-polymer composite prepared using clay as a reinforcement and a foaming agent shows poor physical properties when compared to the pure polymer foam. This is because clay and clay layers are agglomerated by blowing gas bubbles generated by the action of the foaming agent and hence serve as impurities, rather than due to incomplete exfoliation of the clay.

DISCLOSURE

[Technical Problem]

Therefore, the present invention has been made in view of the above problems, and it is a first object of the present invention to provide a clay-polyurethane nanocomposite with markedly improved physical properties in which a polyurethane is covalently bonded to the surface of a clay and the clay is present in an exfoliated state on a nano-scale inside the polyurethane.

The clay-polyurethane nanocomposite can be foamed using a foaming agent to prepare a foamed clay-polyurethane nanocomposite with superior physical properties to a pure polyurethane foam.

It is a second object of the present invention to provide a method for preparing the clay-polyurethane nanocomposite.

[Technical Solution]

In accordance with one aspect of the present invention for achieving the first object, there is provided a clay-polyurethane nanocomposite comprising a clay and a polyurethane covalently bonded to the surface of the clay wherein the polyurethane is formed by reacting a clay-containing diisocyanate compound with a polyol, the clay-containing diisocyanate compound contains a diisocyanate compound covalently bonded to surface silanol groups of the clay and 0.5~5% by weight of the clay based on the diisocyanate compound, and the clay is exfoliated by the polyurethane such that no wide-angle X-ray diffraction (WAXD) peak is detected between 2° and 10° by XRD measurement.

In accordance with another aspect of the present invention for achieving the second object, there is provided a method for preparing the clay-polyurethane nanocomposite, comprising the steps of:

(a) mixing a diisocyanate compound with a clay;

(b) stirring the mixture to form covalent bonds between the diisocyanate compound and silanol groups of the clay; and (c) mixing the covalently bonded structure with a polyol and reacting the mixture with stirring.

In one preferred embodiment of the present invention, the method of the present invention may further comprise the step of sonicating the covalently bonded structure, after step (b), to improve the formation efficiency of covalent bonds between the diisocyanate compound and the silanol groups of the clay and the dispersibility between the diisocyanate compound and the clay.

In another preferred embodiment of the present invention, the method of the present invention may further comprise the step of adding a foaming agent during polymerization of the diisocyanate compound and the polyol after the sonication, and reacting the resulting mixture with stirring.

The present invention will now be described in more detail.

The present invention provides a clay-polyurethane nanocomposite comprising a clay and a polyurethane covalently bonded to the surface of the clay wherein the polyurethane is formed by reacting a clay-containing diisocyanate compound with a polyol, the clay-containing diisocyanate compound contains a diisocyanate compound covalently bonded to surface silanol groups of the clay and 0.5~5% by weight of the clay based on the diisocyanate compound, and the clay is exfoliated by the polyurethane such that no wide-angle X-ray diffraction (WAXD) peak is detected between 2° and 10° by XRD measurement.

Specifically, the clay-polyurethane nanocomposite of the present invention has improved physical properties due to the exfoliation of the clay layers within the polyurethane matrix. First, the surface of a clay is modified by reacting a diisocyanate compound with surface silanol groups of the clay so as to have isocyanate groups covalently bonded to the clay surface. Thereafter, the diisocyanate compound is reacted with a polyol to form a polyurethane inside the clay layers. The polyurethane exfoliates the clay layers and uniformly disperses the clay on a nano-scale. This uniform dispersion contributes to an improvement in physical properties, including tensile strength and flexural strength. In this connection, the XRD spectrum of FIG. 2 demonstrates complete exfoliation of the clay layers. From the XRD data of a conventional clay-polymer nanocomposite shown in FIG. 1, it can be seen that the interlayer spacing is increased due to the intercalation of a polymer into a clay. However, the presence of peaks indicates incomplete exfoliation of the layers. In contrast, the absence of wide-angle X-ray diffraction (WAXD) peak in the nanocomposite of the present invention confirms that the clay layers are completely exfoliated.

The clay-polyurethane nanocomposite of the present invention is characterized by the formation of covalent bonds between the silanol groups of the clay and the diisocyanate compound. In the case of a conventional clay-polymer nanocomposite, however, polymer chains are intercalated between the clay layers to create a weak interaction, e.g., by intermolecular force, therebetween. In contrast, strong covalent bonds are formed between the clay surface and the diisocyanate compound, and the polyurethane formed by the reaction between the polyol and the diisocyanate compound based on the covalent bonds can completely exfoliate the clay layers. The clay-polyurethane nanocomposite of the present invention is characterized by the formation of covalent bonds between the remaining clay dispersed in the final nanocomposite and the polyurethane. The exfoliation of the clay layers is evident from the SEM image shown in FIG. 3.

On the other hand, the presence of strong covalent bonds between the clay surface and the diisocyanate compound in the nanocomposite of the present invention can be identified by infrared spectroscopy. To identify the presence of strong covalent bonds, the clay-containing diisocyanate compound is washed with dimethylformamide prior to reaction with the polyol. In the case of a weak interaction, e.g., by van der Waals force, the diisocyanate compound is completely removed from the clay-containing diisocyanate compound by washing with dimethylformamide so that a peak characteristic to the isocyanate group disappears. In contrast, in the case where the clay is covalently bonded to the diisocyanate compound, since the diisocyanate compound still remains on the clay surface despite washing with dimethylformamide, a peak characteristic to the isocyanate group is detected by infrared spectroscopy.

Diisocyanate compounds that can be used in the present invention are not particularly limited so long as they are commonly used to prepare polyurethanes. Examples of suitable diisocyanate compounds include polymeric 4,4'-diphenylmethanediisocyanate (hereinafter, referred to as 'polymeric MDI'), monomeric 4'-diphenylmethanediisocyanate ('monomeric MDI'), and toluene diisocyanate ('TDI'). Of these, since the monomeric MDI and TDI have a smaller molecular size than the polymeric MDI, they have an advantage in terms of easy formation of covalent bonds inside clay. In contrast to these monomeric compounds, the polymeric MDI has the advantage that it can be produced into an extremely hard polyurethane. On the other hand, since the monomeric MDI is a solid at room temperature, it is preferred to select a proper reaction solvent.

The polymeric 4,4'-diphenylmethanediisocyanate used to prepare the nanocomposite of the present invention is a liquid at room temperature and contains 2.3~3.1 functional groups on average. The molecular structure of the polymeric 4,4'-diphenylmethanediisocyanate is represented by Formula 1 below:

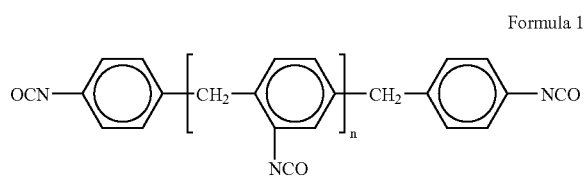

Formula 1

The content of the clay used in the present invention is preferably in the range of 0.5~5% by weight, based on the weight of the diisocyanate compound. When the clay content is lower than 0.5% by weight, an improvement in the physical properties of the final nanocomposite is negligible. Meanwhile, when the clay content exceeds 5% by weight, the clay-containing diisocyanate compound is too viscous, rendering the uniform mixing difficult.

The clay-polyurethane nanocomposite of the present invention prepared without the use of a foaming agent has a flexural strength of 8 MPa or greater. Depending on the clay content, the flexural strength of the nanocomposite may be 10 MPa or greater. In contrast, a pure polyurethane prepared using the same diisocyanate compound and the polyol as in the present invention without any processing according to the present invention has a flexural strength ranging from 7 to 7.5 MPa. In view of this, the clay-polyurethane nanocomposite of the present invention has a flexural strength a maximum of 35% greater than that of the pure polyurethane.

Further, the clay-polyurethane nanocomposite of the present invention prepared without the use of a foaming agent has a tensile strength of 4 MPa or greater. Depending on the clay content, the tensile strength of the nanocomposite may be 6 MPa or greater. In contrast, a pure polyurethane prepared using the same diisocyanate compound and the polyol as in the present invention without any processing according to the present invention has a tensile strength ranging from 3 to 3.5 Mpa. In view of this, the clay-polyurethane nanocomposite of the present invention has a tensile strength a maximum of 70% greater than that of the pure polyurethane.

There is no particular restriction on the clay used to prepare the nanocomposite of the present invention so long as the clay is commonly used in the art. As the clay, there can be used, for example, montmorillonite, bentonite, hectorite, fluorohectorite, saponite, beidelite, nontronite, stevensite, vermiculite, volkonskoite, magadite, kenyalite, or a derivative thereof.

Further, the clay may be treated with an acid, an alkyl ammonium, or an alkyl phosphonium. The acid treatment is to substitute exchangeable cations present inside the layered compound with hydrogen ions by dipping the clay in an inorganic acid, thus increasing the proportion of the silanol groups. The treatment with alkyl ammonium or alkyl phosphonium serves to make the space between the clay layers hydrophobic or lipophilic. As a result, the affinity of the clay for the intercalated diisocyanate compound or the final polyurethane is increased, and at the same time, the interlayer spacing is expanded, facilitating the intercalation of the organic materials and the exfoliation of the clay layers.

Polyols that can be used in the present invention are not particularly limited so long as they are commonly used to prepare polyurethanes. Examples of suitable polyols include polyether polyols and polyester polyols. Since the polyether polyols are widely used because of easy processing due to their low viscosity, excellent stability against hydrolysis, and relatively low cost. The polyester polyols are superior in thermal stability, tensile strength and oil resistance, but are disadvantageous in terms of relatively high cost.

Examples of the polyether polyols include, but are not limited to polyols prepared by polymerization of: ethyleneglycol, 1,2-propaneglycol, 1,3-propyleneglycol, butyleneglycol, 1,6-hexanediol, 1,8-octanediol, neopentylglycol, 2-methyl-1,3-propanediol, glycerol, trimethylolpropane, 1,2,3-hexanetriol, 1,2,4-butanetriol, trimethylolmethane, pentaerythritol, diethyleneglycol, triethyleneglycol, polyethyleneglycol, tripropyleneglycol, polypropyleneglycol, dibutyleneglycol, polybutyleneglycol, sorbitol, sucrose, hydroquinone, resorcinol, catechol, bisphenol, or a mixture thereof; and ethylene oxide, propylene oxide, or a mixture thereof.

The polyester polyols may be those prepared by polymerization of phthalic anhydride or adipic acid; and ethylene oxide, propylene oxide, or a mixture thereof. In addition to these polyols, any polyols commonly known in the art can be used.

In still another embodiment of the present invention, the clay-polyurethane nanocomposite of the present invention can be prepared into a foamed product by the addition of a foaming agent. When a general polymeric material is foamed using a foaming agent, the obtained foamed material has large and non-uniform cell size and thus the tensile strength and compressive strength are considerably deteriorated. When a foaming agent is added to a conventional clay-polyurethane composite material in a state wherein clay layers are incompletely exfoliated, it causes poor dispersibility and the clay acts as an impurity, resulting in considerably poor physical properties as compared to a pure polyurethane foam. In contrast, according to the nanocomposite of the present invention, since the clay is uniformly dispersed in a completely exfoliated state inside the polyurethane, the nanocomposite has superior physical properties, including tensile strength and compressive strength, despite the use of a foaming agent, to a pure polyurethane foam.

Foaming agents that can be used in the present invention are not particularly limited so long as they are commonly used to prepare polyurethanes. As the foaming agents, there can be used, for example, cyclopentane, chlorofluorocarbon, hydrochlorofluorocarbon, hydrofluorocarbon, water, and mixtures thereof. These foaming agents generate the blowing gas having a low thermal conductivity and are stable in air. The amount of the foaming agent added can be controlled depending on the density of foams to be produced. The lower the density of foams to be produced, the larger the amount of the foaming agent added.

The foamed clay-polyurethane nanocomposite of the present invention has a tensile strength and a compressive strength a minimum of 10% higher than those of a pure polyurethane foam with the same density by the use of the same foaming agent in the same amount as the foamed clay-polyurethane nanocomposite of the present invention. The reason for this difference is because the exfoliated clay layers are uniformly dispersed and act as nucleating agents upon foaming to prepare the foamed product. Accordingly, the foamed cells have a very fine and uniform size, and thus the foamed nanocomposite has improved mechanical properties and flame retardance and decreased thermal conductivity.

In a preferred embodiment of the present invention, the clay-polyurethane nanocomposite of the present invention can be prepared with the addition of a chain extender, such as a diol, a triol, a tetraol, a diamine, or an aminoalcohol. The chain extender plays a role in extending or crosslinking the chain of the polyurethane in the nanocomposite to increase the molecular weight of the nanocomposite. Examples of suitable diols include ethyleneglycol, propyleneglycol and 1,4-butanediol. Glycerin is used as the triol, and erythritol is used as the tetraol. On the other hand, examples of suitable diamines include hexamethylenediamine and m-phenylenediamine. Examples of suitable aminoalcohols include diethaneolamine and triethanolamine.

The clay-polyurethane nanocomposite of the present invention can be prepared with the addition of a flame retardant, a cell stabilizer, or a mixture thereof.

The flame retardant is added to improve the flame retardance of the polyurethane, and may be a reaction-type or an addition-type flame retardant. Flame retardants are largely divided into halogen-based, phosphorus-based, and other inorganic flame retardants. On the other hand, the foaming agent is an additive required where the polyurethane is used as a heat insulating material, and foams during formation of the polyurethane so that foaming gases are contained inside the polyurethane cells.

The cell stabilizer is added to form small, uniform cells during production of a foam in order to use the polyurethane as a heat insulating material. As the cell stabilizer, a silicone-based surfactant can be used.

The method for preparing the clay-polyurethane nanocomposite comprises the steps of: (a) mixing a diisocyanate compound with a clay; (b) stirring the mixture to form covalent bonds between the diisocyanate compound and silanol groups of the clay; and (c) mixing the covalently bonded structure with a polyol and reacting the mixture with stirring. Specifically, the method of the present invention is characterized in that a diisocyanate compound is added to a clay to allow the diisocyanate compound to be intercalated between the clay layers and to react with surface silanol groups of the clay layers to form covalent bonds therebetween, and then the covalently bonded structure reacts with a polyol to form a polyurethane, thereby almost completely exfoliating the clay layers.

Diisocyanate compounds that can be used in the present invention are not particularly limited so long as they are commonly used to prepare polyurethanes. Examples of suitable diisocyanate compounds include polymeric MDI, monomeric MDI, and TDI.

The content of the clay used in the method of the present invention is preferably in the range of 0.5~5% by weight, based on the weight of the diisocyanate compound. When the clay content is lower than 0.5% by weight, an improvement in the physical properties of the final nanocomposite is negligible. Meanwhile, when the clay content exceeds 5% by weight, the clay-containing diisocyanate compound is too viscous, rendering the uniform mixing difficult.

In the method of the present invention, steps (a) and (b) are preferably carried out in the range of 25 to 80° C. If the temperature is lower than 25° C., little or no reaction takes place between the isocyanate groups and the silanol groups and thus the desired covalent bonds are not formed. If, on the other hand, the temperature exceeds 80° C., organic substances contained inside the clay are degraded and eventually there arises a danger of decreased spacing between the clay layers. In addition, too high a reactivity causes a rapid reaction with moisture in air, resulting in a marked increase in the viscosity of the diisocyanate compound and an increase in the amount of $CO_2$ bubbles through a chemical reaction with the moisture. Thus, there is the problem that much time is required to remove and stabilize the $CO_2$ bubbles.

It is preferred that the mixture of step (a) is stirred at 50~500 rpm for 10~60 minutes, followed by additional stirring at 1,000~4,000 rpm for 2~24 hours. The initial stirring is carried out for better dispersion of the clay. Too high a stirring speed in the early stage causes agglomeration of the clay and a dramatic decrease in the reaction sites where the diisocyanate compound can react with the surface silanol groups of the clay, leading to an insufficient reaction therebetween. If the initial stirring is carried out for less than 10 minutes, the dispersion of the clay is poor. If, on the other hand, the initial stirring is carried out for a time of more than 60 minutes, there is the danger of reduced processing efficiency. When the subsequent stirring is carried out at a speed of 1,000 rpm or lower, the diisocyanate compound is insufficiently permeated between the layered structure of the clay, making the participation of the diisocyanate compound in the reaction between the clay and the diisocyanate compound difficult. Following the initial stirring, the subsequent stirring is preferably carried out at a high speed of more than 1,000 rpm. On the other hand, when the subsequent stirring is carried out at a speed exceeding 4,000 rpm, it is difficult to maintain a sufficient time for the reaction between the clay and the diisocyanate compound. Further, a shear force applied to the inside of the clay layers is excessively increased, causing separation of substances present inside the clay from the clay. Meanwhile, when the vigorous stirring is carried out for less than 2 hours, the formation efficiency of covalent bonds is low. When the stirring is carried out for a time exceeding 24 hours, reaction sites of the isocyanate groups react with the silanol groups or moisture, thus risking the danger of losing.

The reaction of step (c) is preferably carried out at 5~40° C. When the reaction temperature is lower than 5° C., the reaction does not tend to proceed. Meanwhile, when the reaction temperature exceeds 40° C., the reaction rate is too high, and as a result, the diisocyanate compound present outside the clay is reacted with the polyol before the isocyanate groups covalently bonded to the clay layers are sufficiently reacted with the polyol, resulting in the danger of solidification.

The ratio NCO/OH in step (c) is preferably in the range of from 1.0/1.0 to 1.5/1.0. When the ratio is less than 1.0/1.0 (i.e. the polyol is used in an excess amount), the formation reaction of the polyurethane cannot be completed. When the ratio exceeds 1.5/1.0, a hard polyurethane to be prepared is so stiff that it is liable to break.

In the method of the present invention, an amine-based catalyst can be used. Examples of suitable amine-based catalysts include pentamethylenediethyelentriamine, dimethylcyclohexylamine, tris(3-dimethylamino)propylhexahydrotriamine, and triethylenediamine. These catalysts may be used alone or in combination. It is preferred that the catalyst is used in an amount of not more than 3.0% by weight, based on the weight of the polyol. If the catalyst is used in an amount exceeding 3.0% by weight, the reaction rate is too high, and as a result, solidification takes place before the diisocyanate compound covalently bonded to the clay layers are sufficiently reacted with the polyol, resulting in the danger of incomplete preparation of the nanocomposite.

The method of the present invention may further comprise the step of sonicating the covalently bonded structure, after step (b), to improve the formation efficiency of covalent bonds between the diisocyanate compound and the silanol groups of the clay and the dispersability between the diisocyanate compound and the clay. Any industrial ultrasound generator can be, without limitation, used in the method of the present invention. The frequency of the ultrasound generator is preferably not greater than 200 kHz. If the frequency is not less than 200 kHz, the generator serves to disrupt the clay plates, adversely affecting the physical properties of the nanocomposite. Since the sonication can increase the contact area between the diisocyanate compound and the silanol groups of the clay, the formation efficiency of covalent bonds therebetween is increased, leading to an improvement in the compatibility of the clay with the polyurethane in the final nanocomposite. In addition, since the exfoliated clay can be uniformly dispersed, the final nanocomposite is superior in mechanical properties, flame retardance, etc. At this time, the sonication is preferably performed at a reaction temperature of 5~80° C. for 5~60 minutes. When the sonication is performed for less than 5 minutes, the sonication effects are no or few. On the other hand, when the sonication is performed for a time exceeding 60 minutes, the sonication effects are excessive and thus there arises the danger that the clay plates may be disrupted, resulting in poor physical properties. When the reaction temperature is lower than 5° C., the reactivity between the isocyanate groups and the silanol groups is deteriorated and thus the formation efficiency of covalent bonds is low. On the other hand, when the reaction temperature is higher than 80° C., organic substances contained inside the clay are degraded and eventually there arises a danger of decreased spacing between the clay layers. In addition, too high a reactivity causes a rapid reaction with moisture in air, resulting in a marked increase in the viscosity of the diisocyanate compound and an increase in the amount of $CO_2$ bubbles through a chemical reaction with the moisture. Thus, there is the problem that much time is required to remove and stabilize the $CO_2$ bubbles.

The method of the present invention may further comprise the step of adding a foaming agent during polymerization of the diisocyanate compound and the polyol after the sonication, and reacting the resulting mixture with stirring to prepare a foamed clay-polyurethane nanocomposite.

The addition of the foaming agent to prepare the foamed nanocomposite is desirably carried out at 5~40° C. If the addition is carried out below 5° C., the foaming reaction does not tend to occur and thus the desired foam structure cannot be produced. If, meanwhile, the addition is carried out above 40° C., the foaming reaction rate is extremely high and thus foamed cells are ruptured or a large volume of foaming gases are rapidly released, thus risking the danger that a large cavity may be formed in the center of the foam.

On the other hand, even in the case where the foamed clay-polyurethane nanocomposite is prepared using the foaming agent, an amine-based catalyst selected from pentamethylenediethyelentriamine, dimethylcyclohexylamine, tris(3-dimethylamino)propylhexahydrotriamine, and triethylenediamine, can be used. These catalysts may be used alone or in combination. The amount of the catalyst used should be controlled, taking into consideration both the reaction between the polyol and the diisocyanate compound and the foaming reaction of the foaming agent. The catalyst is preferably used in an amount of not more than 3.0% by weight, based on the weight of the polyol. When the amount of the catalyst exceeds 3.0% by weight, the reaction rate is extremely high, and as a result, solidification takes place before the diisocyanate compound covalently bonded to the clay layers are sufficiently reacted with the polyol, resulting in the danger of incomplete preparation of the foamed nanocomposite. In addition, since the foamed product is rapidly formed in the early stage of the reaction, there is the problem that the foamed product cannot be prepared in a continuous manner.

In the method of the present invention, sonication may or may not be performed. It is preferred that sonication is performed in order to prevent the dispersed clay from being re-agglomerated upon foaming and thus to improve the physical properties of the foamed nanocomposite.

[Advantageous Effects]

The clay-polyurethane nanocomposite of the present invention has a structure wherein the clay layers are completely exfoliated, rather than a structure wherein the polyurethane is intercalated between the clay layers. Accordingly, the clay-polyurethane nanocomposite has superior physical properties to a pure polyurethane. In addition, the foamed clay-polyurethane nanocomposite of the present invention has superior physical properties, such as mechanical strength and flame retardance, to a common polyurethane foam. Furthermore, since the clay is almost completely exfoliated inside the polyurethane by the method of the present invention, the physical properties of the polyurethane can be considerably improved, unlike in conventional methods.

DESCRIPTION OF DRAWINGS

The above and other objects, features and other advantages of the present invention will be more clearly understood from the following detailed description taken in conjunction with the accompanying drawings, in which.

MODE FOR INVENTION

EXAMPLE 1

Figure 1:
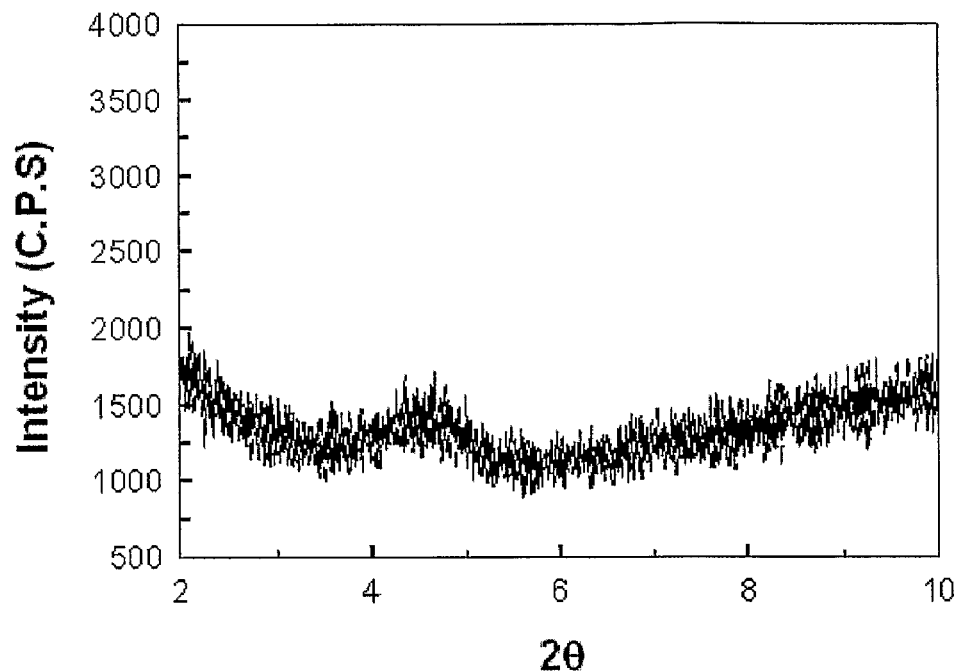
FIG. 1 is an XRD spectrum of a conventional clay-polyurethane composite.

1-(1). Preparation of Polymeric MDI Containing Modified Clay

An organic clay (Closite 15A, Southern Clay Products) treated with an alkyl amine salt and having an interlayer spacing of 31.5 Å was dried in a vacuum oven at 90° C. for 24 hours to remove moisture contained therein. Next, 0.5% by weight of the clay was added to polymeric MDI (M20, BASF), based on the weight of the polymeric MDI, and the resulting mixture was reacted in an oil thermostatic bath while maintaining the reaction temperature at 50° C. The reaction mixture was stirred using a mechanical stirrer at a relatively low speed of 200 rpm for 30 minutes, followed by stirring at a relatively high speed of 2,000 rpm for 4 hours, so as to facilitate the intercalation of the polymeric 4,4'-diphenylmethanediisocyanate between the clay layers and to smoothly proceed the reaction.

1-(2). Preparation of Clay-Polyurethane Nanocomposite 101.3 g of the modified clay-containing polymeric MDI, and 100 g of polyol (KTF 103, FINETEC, Korea), which was prepared by polymerization of pentaerythritol, propylene oxide and ethylene oxide, were reacted with each other at room temperature to prepare a clay-polyurethane nanocomposite. At this time, the clay-containing polymeric 4,4'-diphenylmethanediisocyanate was added in an amount 5 wt % larger than the stoichiometric ratio. Thereafter, the mixture was reacted with stirring using a mechanical stirrer at 3,000 rpm for 60 seconds.

EXAMPLE 2

A clay-polyurethane nanocomposite was prepared in the same manner as in Example 1, except that an organic clay having an interlayer spacing of 11.7 Å was used.

EXAMPLE 3

A clay-polyurethane nanocomposite was prepared in the same manner as in Example 1, except that the amount of the clay was increased to 1% by weight, based on the weight of the polymeric MDI.

EXAMPLE 4

A clay-polyurethane nanocomposite was prepared in the same manner as in Example 1, except that the amount of the clay was increased to 3% by weight, based on the weight of the polymeric MDI.

EXAMPLE 5

A clay-polyurethane nanocomposite was prepared in the same manner as in Example 1, except that the amount of the clay was increased to 5% by weight, based on the weight of the polymeric MDI.

EXAMPLE 6

6-(1). Preparation of Polymeric MDI Containing Modified Clay by Sonication

An organic clay (Closite 15A, Southern Clay Products) treated with an alkyl amine salt and having an interlayer spacing of 31.5 Å was dried in a vacuum oven at 90° C. for 24 hours to remove moisture contained therein. Next, 3.0% by weight of the clay was added to polymeric MDI (M20, BASF), based on the weight of the polymeric MDI, and the resulting mixture was reacted in an oil thermostatic bath while maintaining the reaction temperature at 50° C. The reaction mixture was stirred using a mechanical stirrer at a relatively low speed of 200 rpm for 30 minutes, followed by stirring at a relatively high speed of 2,000 rpm for 2 hours, so as to facilitate the intercalation of the polymeric 4,4'-diphenylmethanediisocyanate between the clay layers and to smoothly proceed the reaction. After stirring, the modified clay-containing polymeric MDI was subjected to sonication at a frequency of 40 kHz for 15 minutes.

6-(2). Preparation of Foamed Clay-Polyurethane Nanocomposite by Sonication 125 g of the modified clay-containing polymeric MDI, 100 g of polyol (KTF 103, FINETEC, Korea), which was prepared by polymerization of pentaerythritol, propylene oxide and ethylene oxide, and 1.5 g of water as a foaming agent were reacted at room temperature to prepare a foamed clay-polyurethane nanocomposite. At this time, the clay-containing polymeric 4,4'-diphenylmethanediisocyanate was added in an amount 5 wt % larger than the stoichiometric ratio. Thereafter, the mixture was reacted with stirring using a mechanical stirrer at 3,000 rpm for 60 seconds. The foamed clay-polyurethane nanocomposite thus prepared had a density of 88 $kg/m^3$.

EXAMPLE 7

A foamed clay-polyurethane nanocomposite was prepared in the same manner as in Example 6, except that the sonication was performed for 10 minutes and the amount of the clay was decreased to 1% by weight, based on the weight of the polymeric MDI. The foamed clay-polyurethane nanocomposite had a density of 88 $kg/m^3$.

EXAMPLE 8

A foamed clay-polyurethane nanocomposite was prepared in the same manner as in Example 6, except that the sonication was performed for 10 minutes and the amount of the clay was increased to 5% by weight, based on the weight of the polymeric MDI. The foamed clay-polyurethane nanocomposite had a density of 88 $kg/m^3$.

COMPARATIVE EXAMPLE 1

A polyurethane was prepared in the same manner as in Example 1, except that the clay was not used.

COMPARATIVE EXAMPLE 2

A polyurethane foam was prepared in the same manner as in Example 6, except that the clay was not used.

TEST EXAMPLE 1

Test for Bonding Characteristics Between Clay Surface and Polymeric MDI

Figure 4:
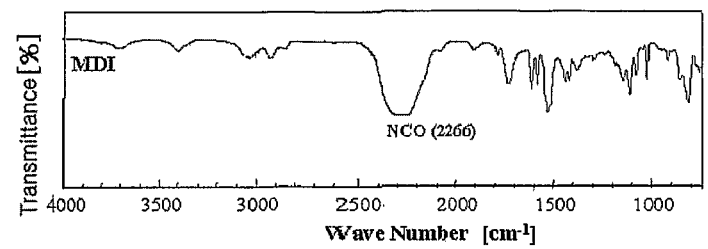
FIG. 4(a) is an IR spectrum of polymeric MDI used in the present invention.
FIG. 4(b) shows IR spectra of an organic clay used in Example 1 and a modified clay prepared in Example 1 of the present invention.
FIG. 4(c) shows IR spectra of an organic clay used in Example 2 and a modified clay prepared in Example 2 of the present invention.
Figure 4:
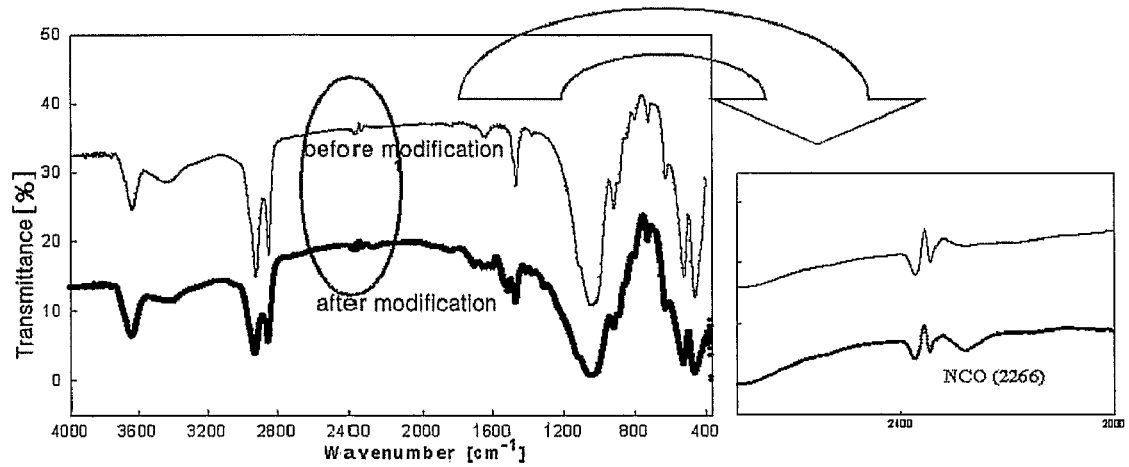
Figure 4:
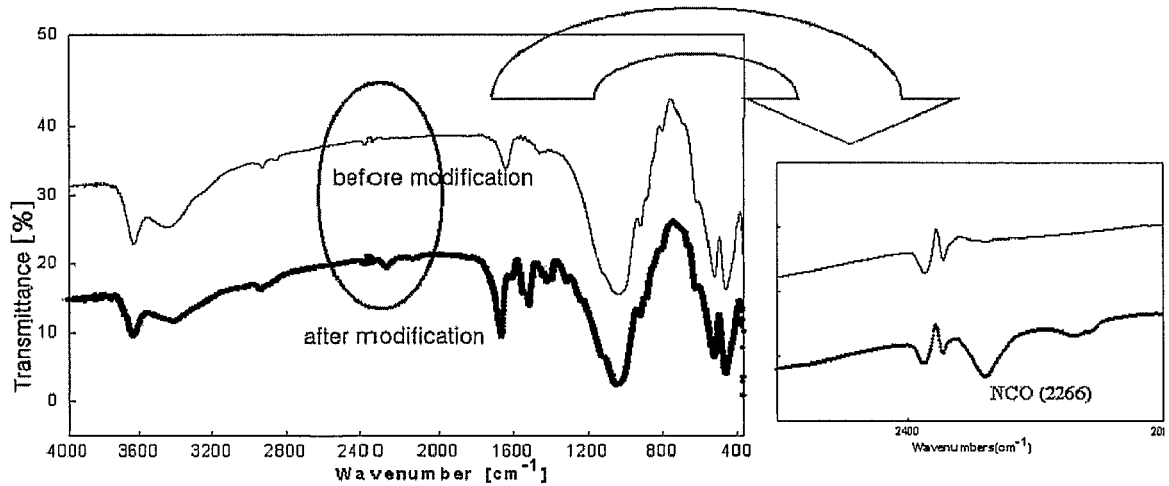

To confirm whether or not covalent bonds were formed between surface silanol groups of the clay layers and each polymeric MDI containing the modified clays prepared in Examples 1 and 2, the modified clays alone were separated. Specifically, the modified clay-containing polymeric MDI was diluted in dimethylformamide, filtered using a filtering apparatus, and washed with cyclopentane several times to obtain the modified clay alone. Peak analysis for the modified clay was conducted by FT-IR spectrometry, and the analytical results are shown in FIG. 4. FIG. 4(a) is an IR spectrum of the polymeric MDI used in Examples 1 and 2, FIG. 4(b) shows IR spectra of the organic clay used in Example 1 and the modified clay prepared in Example 1, and FIG. 4(c) shows IR spectra of the organic clay used in Example 2 and the modified clay prepared in Example 2.

As can be seen from the spectrum of FIG. 4(a), one peak characteristic to the isocyanate group was detected at 2,266 $cm^{-1}$. This peak was observed in the spectra of FIGS. 4(b) and 4(c), too. This observation reveals that the polymeric MDI was covalently bonded to the clay surface. This is because the polymeric MDI was completely dissolved in the dimethylformamide. If the polymeric MDI is not attached to the clay layers by covalent bond and instead intermolecular force, it will dissolve in DMF and pull out within clay layers during filtering and washing process. And as a result, no peak characteristic to the isocyanate group can be observed in the IR spectra of the final modified clays.

TEST EXAMPLE 2

Test for Exfoliated State of Clay

Figure 3:
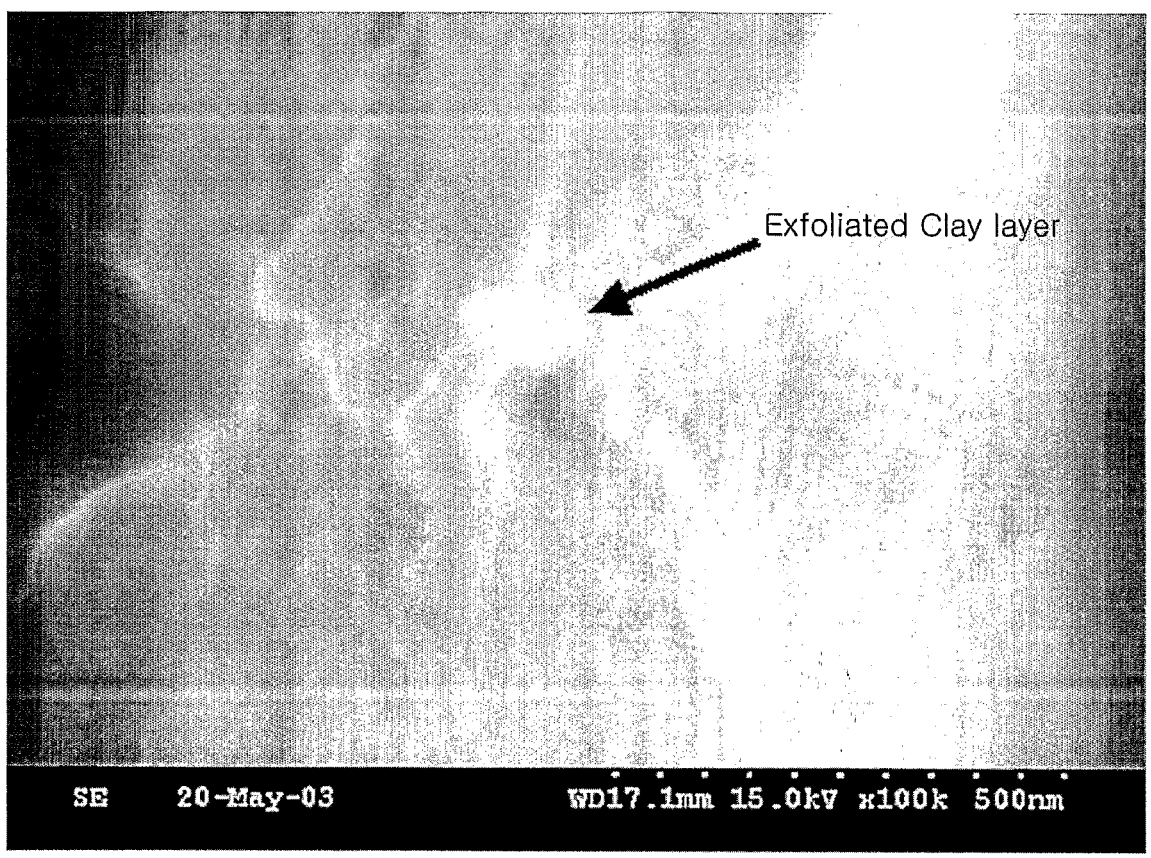
FIG. 3 is a field emission-scanning electron microscopy (FE-SEM) image of a clay-polyurethane nanocomposite prepared in Example 1 of the present invention.

The dispersability, structure disruption and exfoliation of the clay contained in the clay-polyurethane nanocomposite prepared in Example 1 were observed using a field emission-scanning electron microscope (FE-SEM). The results are shown in FIG. 3.

In the clay-polyurethane nanocomposite, the polymeric MDI covalently bonded to the inside of the clay layers was reacted with the polyol to form the polyurethane, which expanded the spacing between the clay layers and eventually exfoliated the clay layers. From FIG. 3, it is clearly seen that the clay layers were exfoliated and fallen apart.

TEST EXAMPLE 3

Test for Interlayer Spacing of Clay

Figure 5:
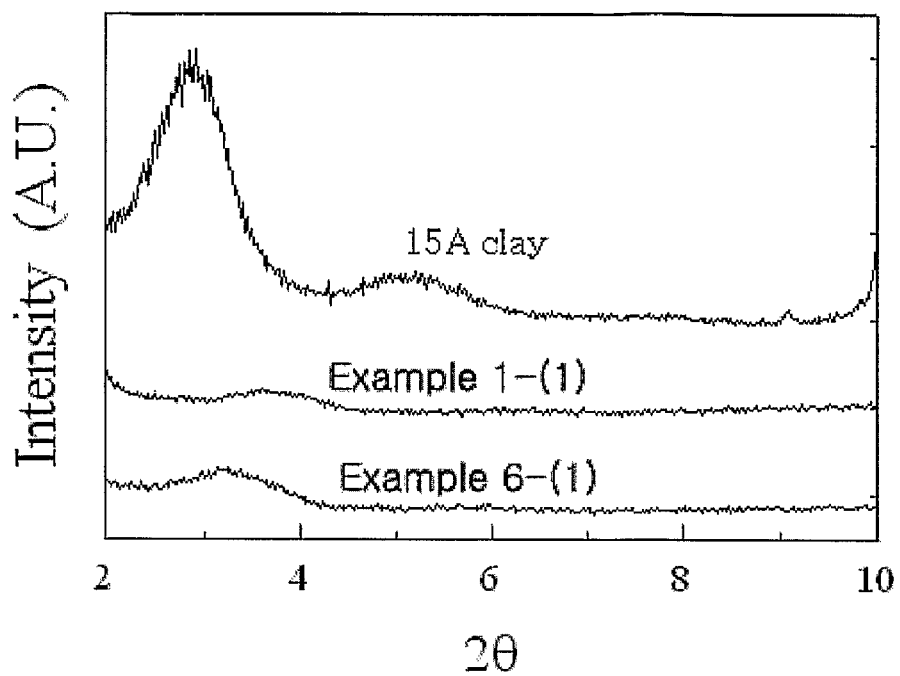
FIG. 5 shows XRD spectra of a modified clay prepared in Example 1-(1), a modified clay prepared in Example 6-(1), and a pure organic clay without undergoing any modification.

To measure the interlayer spacing of the modified clay prepared in Example 1-(1), the modified clay prepared in Example 6-(1), and pure organic clay (Closite 15A, Southern Clay Products) without undergoing any modification, the modified clays alone were separated from each polymeric MDI containing the modified clays prepared in Examples 1-(1) and 6-(1). Specifically, the modified clay-containing polymeric MDI was diluted in dimethylformamide, filtered using a filtering apparatus, and washed with cyclopentane several times to obtain the modified clay alone. Wide-angle X-ray diffraction (WAXD) patterns of the modified clays were observed by X-ray diffraction analysis, and the results are shown in FIG. 5. The interlayer spacing of the clays was calculated by Bragg's law ($2d \sin \theta = n\lambda$), and was measured at $2\sim10°$ under the operation conditions of 100 mA and 40 kV.

Generally, the $2\theta$ value of a wide-angle X-ray diffraction peak represents the interlayer spacing of clay. That is, the lower the $2\theta$ value, the larger the interlayer spacing. When the clay layers are completely exfoliated, the peak disappears. As can be seen from FIG. 5, the WAXD peak of the modified clay prepared in Example 1-(1) is less intense than that of the organic clay (Closite 15A, Southern Clay Products) without undergoing any modification. This is because the polymeric MDI was covalently bonded to the inside of the clay layers and thus the interlayer spacing of the clay increased. In addition, the WAXD peak of the modified clay prepared in Example 6-(1) is observed to be less intense than that of the modified clay prepared in Example 1-(1). It is believed that this is because the formation efficiency of covalent bonds between the polymeric MDI and the inside of the clay layers was increased by sonication.

TEST EXAMPLE 4

Test for Interlayer Spacing of Clay Inside Nanocomposite

Figure 2:
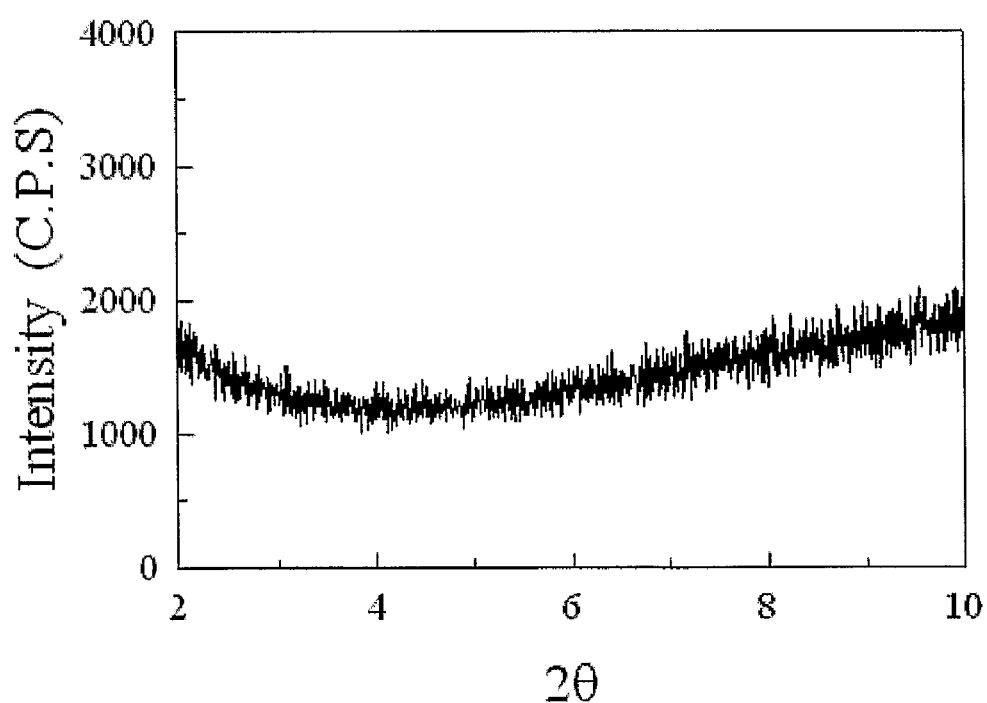
FIG. 2 is an XRD spectrum of a clay-polyurethane nanocomposite prepared in Example 1 of the present invention.

The nanocomposite prepared in Example 1 was cut into small pieces having a thickness of 1 mm or less, and analysis was conducted using an X-ray diffraction analyzer. The interlayer spacing of the clay was calculated by Bragg's law, and was measured at $2\sim10°$ under the operation conditions of 100 mA and 40 kV. The obtained results are shown in FIG. 2. The XRD spectrum of FIG. 2 demonstrates that the clay was completely exfoliated in the clay-polyurethane nanocomposite. This is because the polymeric MDI covalently bonded to the inside of the clay layers was reacted with the polyol to form the polyurethane, which expanded the spacing between the clay layers and eventually exfoliated the clay layers.

TEST EXAMPLE 5

Flexural Strength Test

Figure 6:
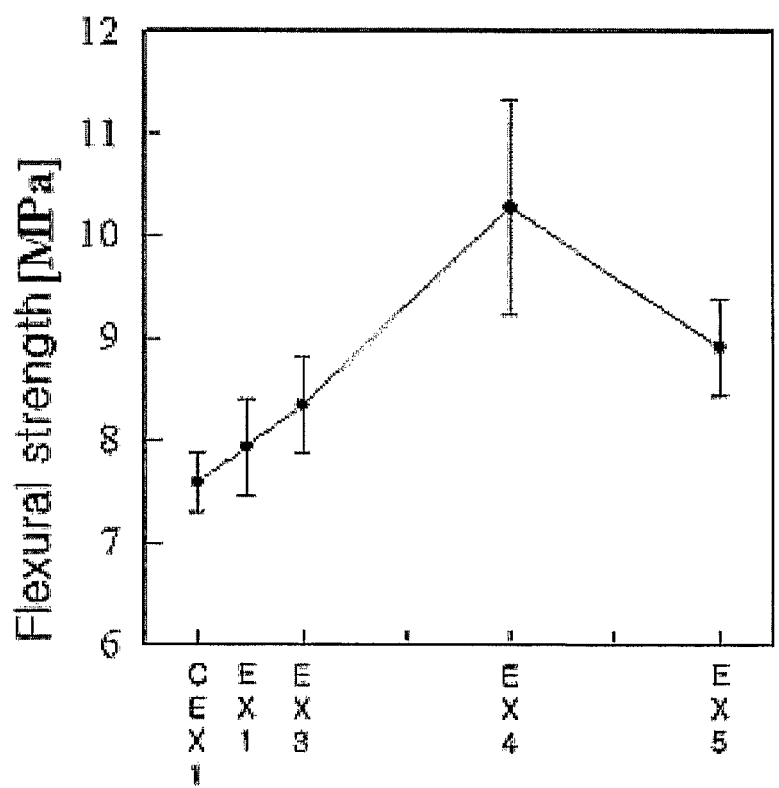
FIG. 6 is a graph showing flexural strength test results for clay-polyurethane nanocomposites prepared in Examples 1, 3, 4 and 5, and a polyurethane prepared in Comparative Example 1.

The flexural strength of the clay-polyurethane nanocomposites prepared in Examples 1, 3, 4 and 5 and the polyurethane prepared in Comparative Example 1 was measured in accordance with the ASTM D790 standard test method, and the results are shown in FIG. 6. The results show that the clay-polyurethane nanocomposites of the present invention had superior flexural strength to the pure polyurethane using no clay. As the amount of the clay increased to 3% by weight based on the weight of the polymeric MDI, the flexural strength of the nanocomposites increased. However, when the amount of the clay was above 3% by weight, the excessive clay was agglomerated and thus the flexural strength of the nanocomposites was decreased. The clay-polyurethane nanocomposite of Example 4 containing 3% by weight of the clay, based on the weight of the polymeric MDI, had the best flexural strength, which was 35% or more higher than that of the polyurethane prepared in Comparative Example 1.

TEST EXAMPLE 6

Tensile Strength Test

Figure 7:
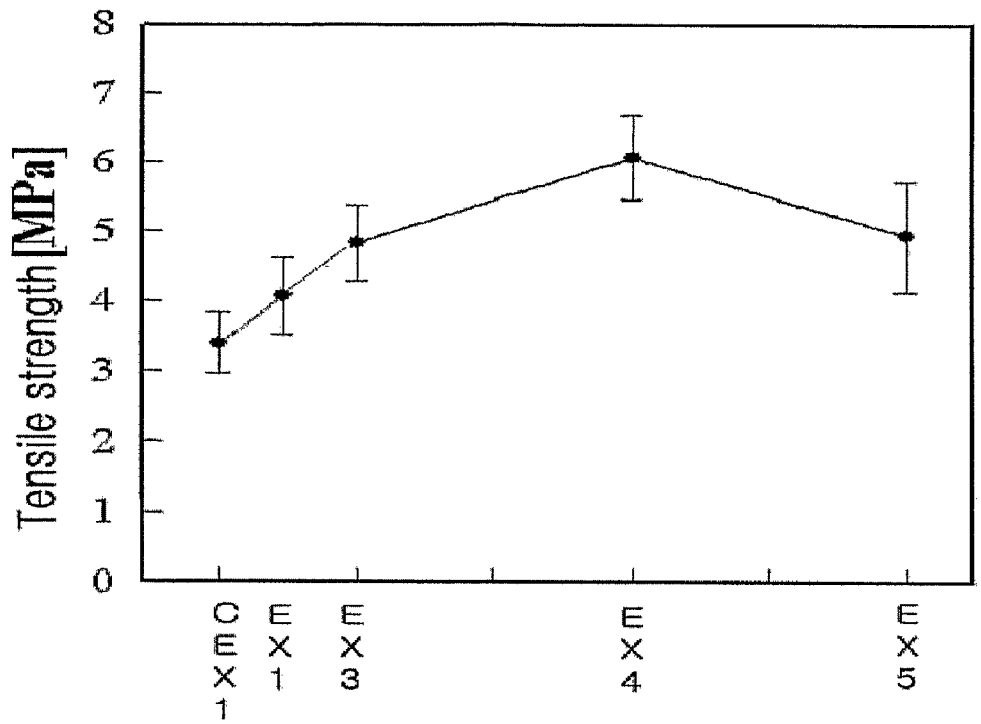
FIG. 7 is a graph showing tensile strength test results for clay-polyurethane nanocomposites prepared in Examples 1, 3, 4 and 5, and a polyurethane prepared in Comparative Example 1.
Figure 8:
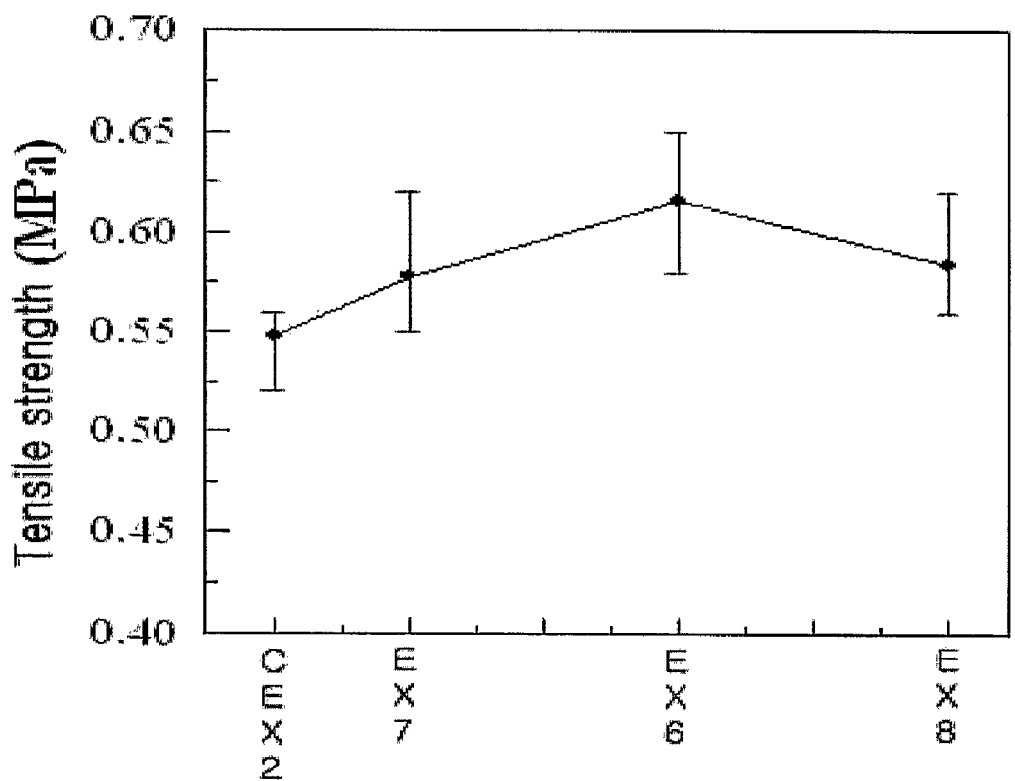
FIG. 8 is a graph showing tensile strength test results for foamed clay-polyurethane nanocomposites prepared in Examples 6 to 8 and a polyurethane foam prepared in Comparative Example 2.

The tensile strength of the clay-polyurethane nanocomposites prepared in Examples 1, 3, 4 and 5 and the polyurethane prepared in Comparative Example 1 was measured in accordance with the ASTM D638 standard test method, and the results are shown in FIG. 7. The tensile strength of the foamed clay-polyurethane nanocomposites prepared in Examples 6 to 8 and the pure polyurethane foam prepared in Comparative Example 2 was measured in accordance with the ISO 1926 standard test method, and the results are shown in FIG. 8. The results indicate that the clay-polyurethane nanocomposites of the present invention had superior tensile strength to the pure polyurethane using no clay, and that the foamed clay-polyurethane nanocomposites of the present invention had superior tensile strength to the pure polyurethane foam using no clay. As the amount of the modified clay increased to 3% by weight based on the weight of the polymeric MDI, the tensile strength of the nanocomposites increased. However, when the amount of the clay was above 3% by weight, the excessive clay was agglomerated and thus the tensile strength of the nanocomposites was decreased. The clay-polyurethane nanocomposite of Example 4 containing 3% by weight of the clay, based on the weight of the polymeric MDI, had the best tensile strength, which was by 70% or more higher than that of the polyurethane prepared in Comparative Example 1. The foamed clay-polyurethane nanocomposite of Example 6 containing 3% by weight of the clay, based on the weight of the polymeric MDI, had the best tensile strength, which was by 44% or more higher than that of the polyurethane foam prepared in Comparative Example 2. In general, since a conventional clay-containing polymer has a structure wherein a clay is not completely exfoliated, the use of a foaming agent, including the clay and clay layers to agglomerate from the foaming reaction, in the clay-containing polymer results in considerably poor mechanical properties as compared to the pure polyurethane foam. In contrast, the foamed clay-polyurethane nanocomposites of the present invention have superior mechanical properties to the pure polyurethane foam. This indicates that the foamed clay-polyurethane nanocomposites of the present invention have a structure wherein a clay is uniformly dispersed in a completely exfoliated state.

TEST EXAMPLE 7

Compressive Strength Test

Figure 9:
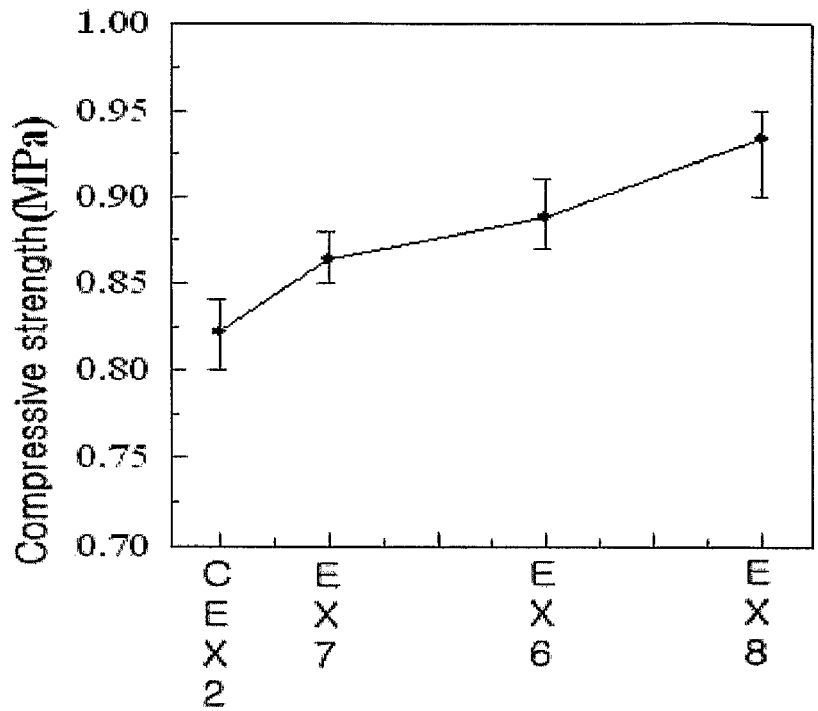
FIG. 9 is a graph showing compressive strength test results for foamed clay-polyurethane nanocomposites prepared in Examples 6 to 8 and a polyurethane foam prepared in Comparative Example 2.

The compressive strength of the foamed clay-polyurethane nanocomposites prepared in Examples 6 to 8 and the polyurethane foam prepared in Comparative Example 2 was measured in accordance with the ASTM D1621 standard test method, and the obtained results are shown in FIG. 9. As is evident from the results, the foamed clay-polyurethane nanocomposites of the present invention had a higher compressive strength than the pure polyurethane foam. As the amount of the modified clay by sonication increased to 5% by weight, based on the weight of the polymeric MDI, the compressive strength of the foamed clay-polyurethane nanocomposites increased. Taking into consideration the viscosity, the best compressive strength was achieved when the content of the modified clay by sonication was 5% by weight, based on the weight of the polymeric MDI.

TEST EXAMPLE 8

Flame Retardance Test

The flame retardance of the foamed clay-polyurethane nanocomposites prepared in Examples 6 to 8 and the pure polyurethane foam prepared in Comparative Example 2 was measured in accordance with the JIS A9514 standard test method, and the obtained results are shown in Table 1. For flame retardance measurement, test specimens were brought into direct contact with a flame for 60 seconds, and were then placed at a distance of 150 mm or more apart from the flame. The amount of time (fire-extinguishing time) taken for each of the test specimens to be extinguished from the contact with the flame and the length (fire-burnt distance) of the most heavily burnt part in the test specimen were measured. Since the polyurethane foams are highly inflammable, it is necessary to prevent the foams from being completely burnt for comparison of the flame retardance of the foams. To this end, a phosphorus-based flame retardant was used in an amount of 10% by weight, based on the weight of the polyol. As a result, the foamed clay-polyurethane nanocomposites of the present invention had superior flame retardance to the pure polyurethane foam. As the amount of the modified clay by sonication increased to 5% by weight, based on the weight of the polymeric MDI, the flame retardance of the foamed clay-polyurethane nanocomposites increased. Taking into consideration the viscosity, the best flame retardance was achieved when the content of the modified clay by sonication was 5% by weight, based on the weight of the polymeric MDI.

TABLE 1

| Example No. | Fire-extinguishing time (s) | Fire-burnt distance (mm) |
| --- | --- | --- |
| Comparative Example 2 | 75 | 70 |
| Example 6 | 67 | 54 |
| Example 7 | 69 | 60 |
| Example 8 | 66 | 50 |

TEST EXAMPLE 9

Thermal Conductivity Test

Figure 10:
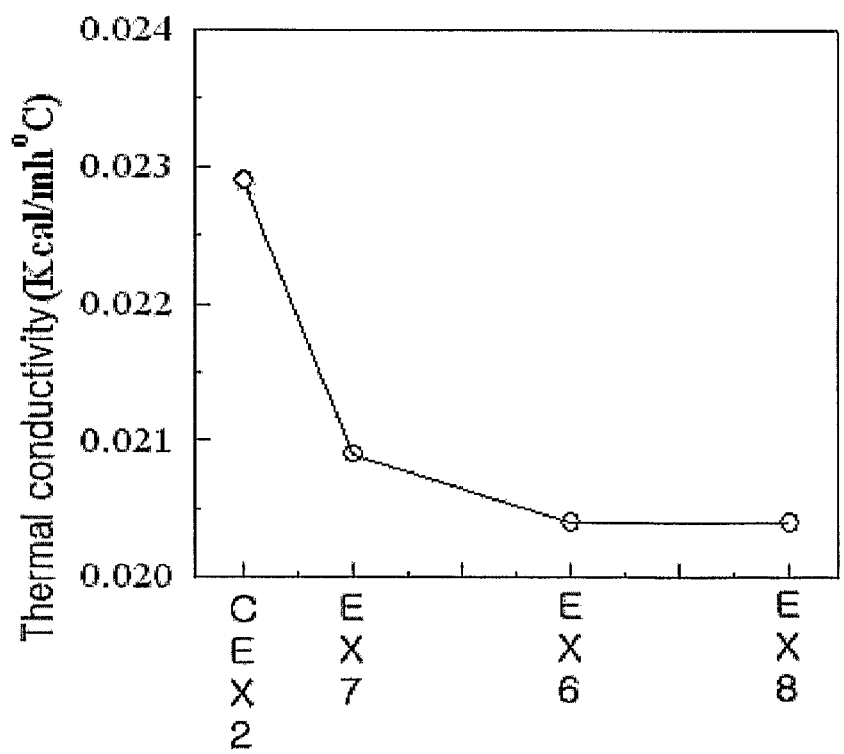
FIG. 10 is a graph showing thermal conductivity test results for foamed clay-polyurethane nanocomposites prepared in Examples 6 to 8 and a polyurethane foam prepared in Comparative Example 2.

The thermal conductivity of the foamed clay-polyurethane nanocomposites prepared in Examples 6 to 8 and the polyurethane foam prepared in Comparative Example 2 was measured in accordance with the ASTM C518 standard test method, and the obtained results are shown in FIG. 10. As is evident from the results, the foamed clay-polyurethane nanocomposites of the present invention had a lower compressive strength than the pure polyurethane foam. As the amount of the modified clay by sonication increased to 3% by weight, based on the weight of the polymeric MDI, the thermal conductivity of the foamed clay-polyurethane nanocomposites decreased. No change in thermal conductivity was observed above 3% by weight of the modified clay. Generally, the thermal conductivity of a polyurethane foam is closely related to the cell size. The smaller the cell size, the lower the thermal conductivity of the polyurethane foam. As the content of the modified clay increased, the cell size of the foamed clay-polyurethane nanocomposites according to the present invention was reduced. Accordingly, the preparation of a foamed clay-polyurethane nanocomposite having the lowest thermal conductivity is possible. Taking into consideration the viscosity, the best thermal conductivity was achieved when the content of the modified clay was 3% by weight, based on the weight of the polymeric MDI.

TEST EXAMPLE 10

Determination of Cell Morphology of Foams

Figure 11:
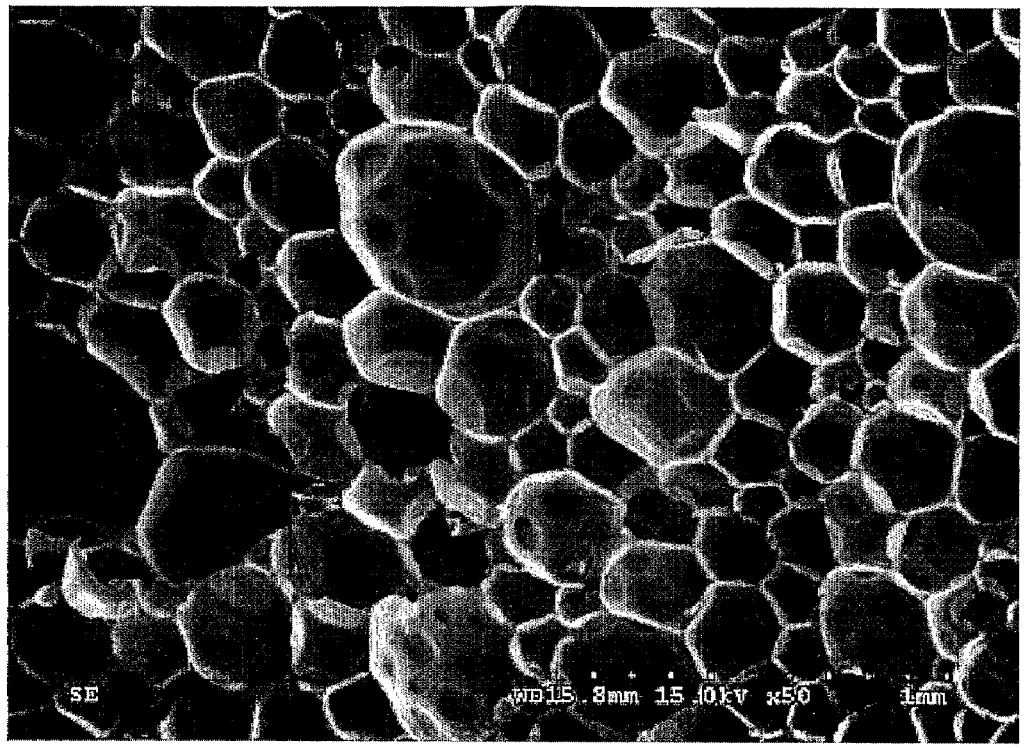
FIG. 11 is an FE-SEM image of a polyurethane foam prepared in Comparative Example 2.
Figure 12:
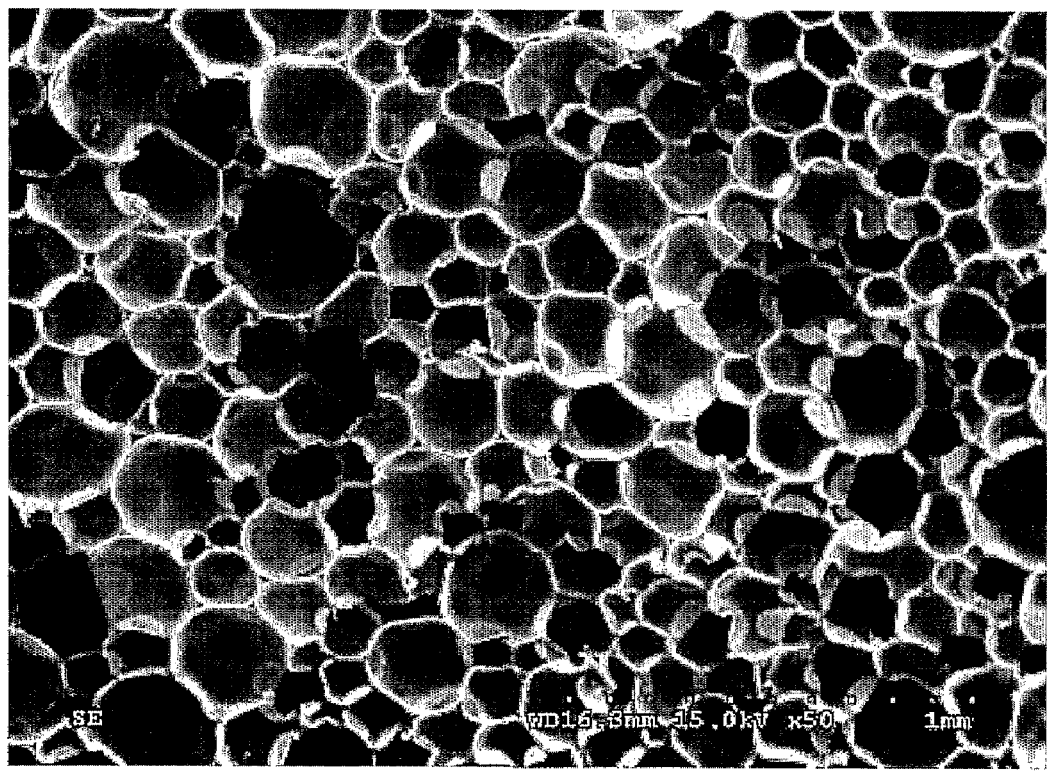
FIG. 12 is an FE-SEM image of a foamed clay-polyurethane nanocomposite prepared in Example 6 of the present invention.
Figure 13:
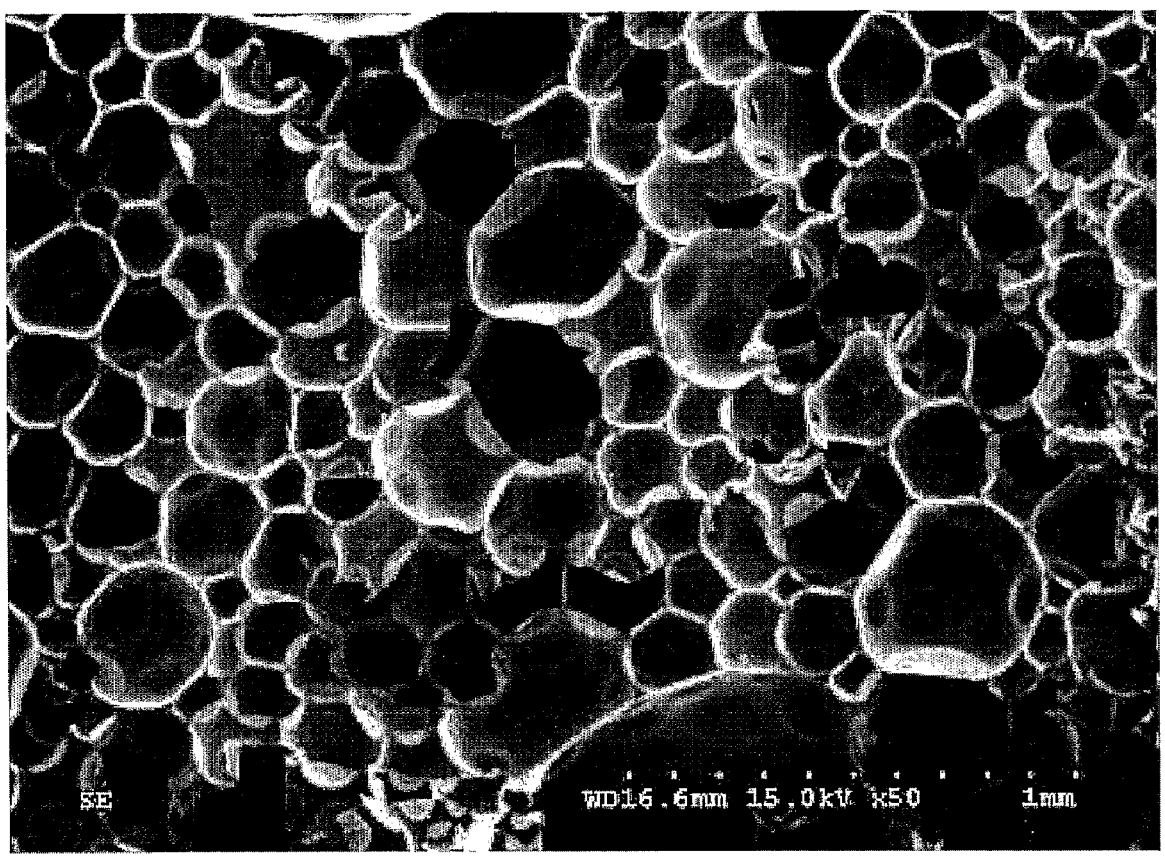
FIG. 13 is an FE-SEM image of a foamed clay-polyurethane nanocomposite prepared in Example 7 of the present invention.

The cell morphology of the foamed clay-polyurethane nanocomposites prepared in Examples 6 and 7 and the polyurethane foam prepared in Comparative Example 2 was determined under a field emission-scanning electron microscope (FE-SEM), and the results are shown in FIGS. 11 to 13. The microscopic results show that the foamed clay-polyurethane nanocomposites of the present invention had smaller cells than the pure polyurethane foam. As the amount of the clay added increased, the cell size of the nanocomposites was reduced. However, taking into consideration the viscosity, the smallest cell size was achieved when the content of the modified clay was 3% by weight, based on the weight of the polymeric MDI.

INDUSTRIAL APPLICABILITY

Since the clay-polyurethane nanocomposites of the present invention has superior physical properties, including flexural strength and tensile strength, to a pure polyurethane, they can be widely used as a variety of industrial materials. In addition, since the foamed clay-polyurethane nanocomposites of the present invention has greatly improved physical properties, including mechanical strength and flame retardance, when compared to common polyurethane foams, they are very useful as flame retardants.

The invention claimed is:

1. A clay-polyurethane nanocomposite comprising a clay and a polyurethane covalently bonded to the surface of the clay wherein the polyurethane is formed by reacting a clay-containing diisocyanate compound with a polyol, the clay-containing diisocyanate compound contains a diisocyanate compound covalently bonded to surface silanol groups of the clay and 0.5~5% by weight of the clay based on the diisocyanate compound, and the clay is exfoliated by the polyurethane such that no wide-angle X-ray diffraction (WAXD) peak is detected between 2° and 10° by XRD measurement.

2. The clay-polyurethane nanocomposite according to claim 1, wherein the diisocyanate compound is polymeric 4,4'-diphenylmethanediisocyanate (polymeric-MDI), monomeric 4'-diphenylmethanediisocvanate (monomeric MDI), or toluene diisocyanate (TDI).

3. The clay-polyurethane nanocomposite according to claim 1, wherein the clay is montmonllonite, bentonite, hectorite, fluorohectonte, saponite, beidelite, nontronite, stevensite, vermiculite, volkonskoite, magadite, kenyalite, or a derivative thereof.

4. The clay-polyurethane nanocomposite according to claim 1, wherein the clay is treated with an acid, an alkyl ammonium, or an alkyl phosphonium.

5. The clay-polyurethane nanocomposite according to claim 1, wherein the polyol is prepared by polymerization of: ethyleneglycol, 1,2-propaneglycol, 1,3-propyleneglycol, butyleneglycol, 1,6-hexanediol, 1,8-octanediol, neopentylglycol, 2-methyl-1,3-propanediol, glycerol, trimethylolpropane, 1,2,3 -hexanetriol, 1,2,4-butanetriol, trimethylolmethane, pentaerythritol, diethyleneglycol, triethyleneglycol, polyethyleneglycol, tripropyleneglycol, polypropyleneglycol, dibutyleneglycol, polybutyleneglycol, sorbitol, sucrose, hydroquinone, resorcinol, catechol, bisphenol, or a mixture thereof; and ethylene oxide, propylene oxide, or a mixture thereof 6. The clay-polyurethane nanocomposite according to claim 1, wherein polyol is prepared by polymerization of: phthalic anhydride or adipic acid; and ethylene oxide, propylene oxide, or a mixture thereof.

7. The clay-polyurethane nanocomposite according to claim 1, wherein the clay-containing diisocyanate compound shows a peak characteristic to the isocyanate group by infrared spectroscopy, after being washed with dimethylformamide.

8. The clay-polyurethane nanocomposite according to claim 1, wherein the clay-polyurethane nanocomposite further comprises a foaming agent and has a tensile strength at minimum of 10% higher than that of a pure polyurethane foam with the same density by the use of the same foaming agent in the same amount as the clay-polyurethane nanocomposite.

9. The clay-polyurethane nanocomposite according to claim 8, wherein the clay-polyurethane nanocomposite further comprises a foaming agent and has a compressive strength at minimum of 10% higher than that of a pure polyurethane foam with the same density by the use of the same foaming agent in the same amount as the clay-polyurethane nanocomposite.

10. The clay-polyurethane nanocomposite according to claim 8, wherein the foaming agents is selected from the group consisting of cyclopentane, chlorofluorocarbon, hydrochlorofluorocarbon, hydrofluorocarbon, water, and mixtures thereof.

11. The clay-polyurethane nanocomposite according to claim 1, further comprising a diol, a triol, a tetraol, a diamine or an aminoalcohol as a chain extender.

12. The clay-polyurethane nanocomposite according to claim 1, further comprising a flame retardant, a cell stabilizer, or a mixture thereof.

13. A method for preparing a clay-polyurethane nanocomposite, comprising the steps of:
(a) mixing a diisocyanate compound with a clay;
(b) stirring the mixture to form covalent bonds between the diisocyanate compound and silanol groups of the clay; and
(c) mixing the covalently bonded structure with a polyol and reacting the mixture with stirring.

14. The method according to claim 13, wherein the diisocyanate compound is polymeric 4,4'-diphenylmethanediisocvanate (polymeric-MDI), monomeric 4'-diphenylmethanediisocyanate (monomeric MDI), or toluene diisocyanate (TDI).

15. The method according to claim 13, wherein the clay is present in an amount of 0.5~5% by weight, based on the diisocyanate compound.

16. The method according to claim 13, wherein steps (a) and (b) are carried out in the temperature range of 25 to 80° C.

17. The method according to claim 13, wherein, in step (b), the mixture of step (a) is stirred at 50~500 rpm for 10~60 minutes, followed by additional stirring at 1,000~4,000 rpm for 2~24 hours.

18. The method according to claim 13, wherein the reaction of step (c) is carried out at temperature of 5~40° C.

19. The method according to claim 13, wherein the ratio NCO/OH in step (c) is in the range of from 1.0/1.0 to 1.5/1.0.

20. The method according to claim 13, wherein the reaction of step (c) is carried out in the presence of a catalyst selected from pentamethylenediethyelentriamine, dimethylcyclohexylamine, tris(3-dimethylamino)propylhexahydrotriamine, triethylenediamine, and mixtures thereof.

21. The method according to claim 13, further comprising the step of sonicating the covalently bonded structure, after step (b), to improve the formation efficiency of covalent bonds between the diisocyanate compound and the silanol groups of the clay and the dispersability between the diisocyanate compound and the clay.

22. The method according to claim 21, wherein sonication is performed at a frequency not greater than 200 kHz and temperature of 5~80° C. for 5~60 minutes.

23. The method according to claim 21, further comprising the step of adding a foaming agent during polymerization of the diisocyanate compound and the polyol after the sonication, and reacting the resulting mixture with stirring.

* * * * *

UNITED STATES PATENT AND TRADEMARK OFFICE
CERTIFICATE OF CORRECTION

PATENT NO. : 7,592,387 B2
APPLICATION NO. : 10/590636
DATED : September 22, 2009
INVENTOR(S) : Woo-Nyon Kim et al.

It is certified that error appears in the above-identified patent and that said Letters Patent is hereby corrected as shown below:

On the Title Page

| | |
|---|---|
| Item (57) Abstract, line 13 | After "layers" Insert -- that -- |
| Column 17, Claim 2, line 15 | Delete "4'-diphenylmethanediisocvanate"<br>Insert -- 4'-diphenylmethanediisocyanate -- |
| Column 17, Claim 3, line 18 | Delete "montmonllonite"<br>Insert -- montmorillonite -- |
| Column 17, Claim 3, line 19 | Delete "fluorochectonte"<br>Insert -- fluorohectorite -- |
| Column 17, Claim 5, line 36 | After "thereof"<br>Insert -- . -- |
| Column 18, Claim 10, line 5 | Delete "agents"<br>Insert -- agent -- |
| Column 18, Claim 14, line 25 | Delete "vanate"<br>Insert -- yanate -- |

Signed and Sealed this
Twelfth Day of April, 2011

David J. Kappos
*Director of the United States Patent and Trademark Office*